United States Patent Office 3,394,051
Patented July 23, 1968

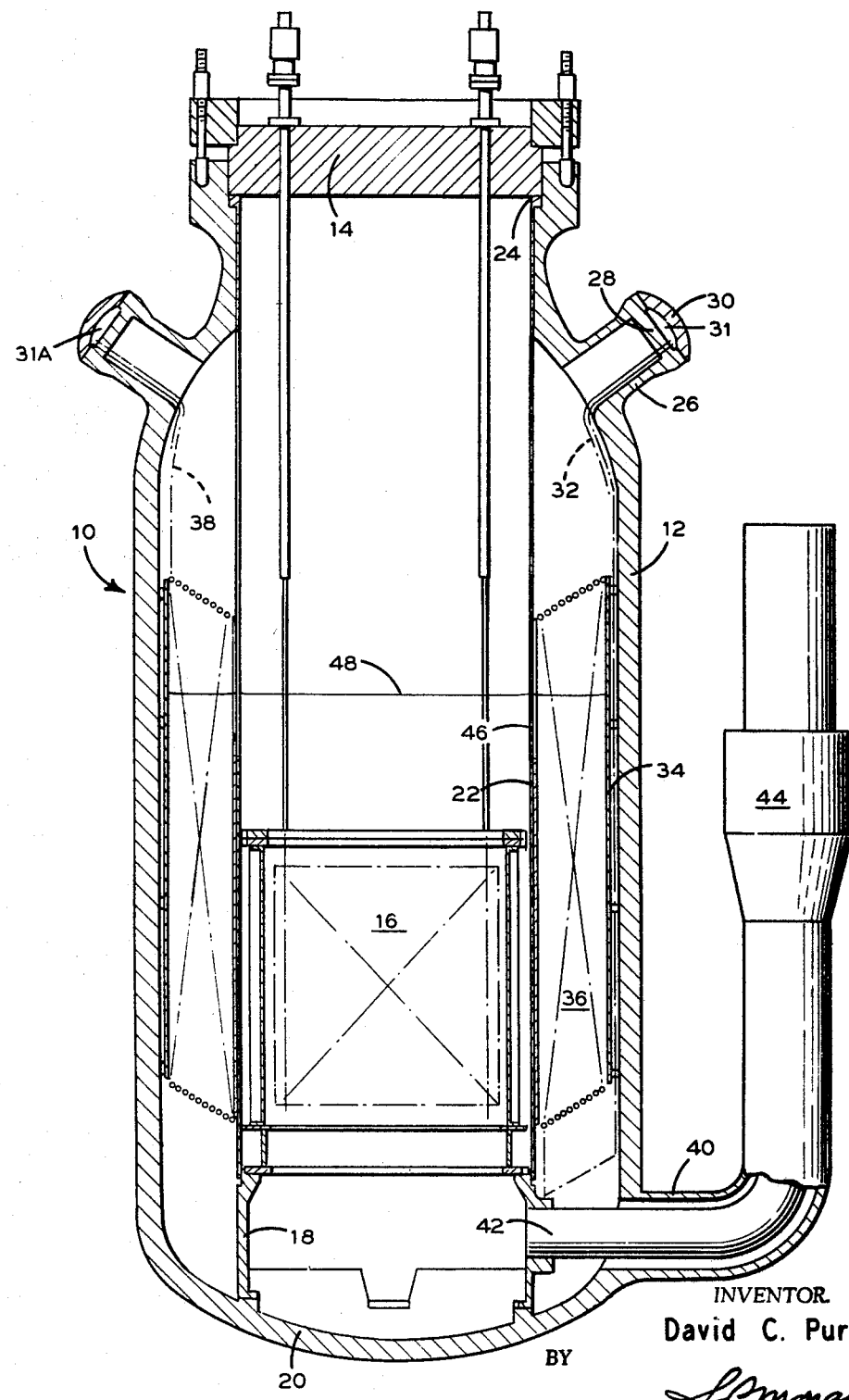

3,394,051
INTEGRAL NUCLEAR REACTOR-STEAM
GENERATOR ARRANGEMENT
David C. Purdy, Lynchburg, Va., assignor to The Babcock
& Wilcox Company, New York, N.Y., a corporation
of New Jersey
Filed Dec. 20, 1965, Ser. No. 515,032
4 Claims. (Cl. 176—54)

ABSTRACT OF THE DISCLOSURE

A nuclear reactor-steam generator arrangement wherein the reactor core, the primary coolant fluid and the steam generating tube bundle are contained within a common pressure vessel in which a hollow member surrounding the core defines with the inside of the vessel an annular space occupied by the tube bundle. Primary coolant is circulated by a pump upwardly through the hollow member to extract heat from the core, into the annular space through an upper opening in the hollow member, and downwardly through the annular space to transfer heat to feedwater flowing through the steam generating tubes to generate superheated steam. To minimize overall height and yet allow normal operation when the pressure vessel is subjected to pitch and roll deviations from a vertical attitude, the tube bundle extends in elevation from approximately the lower end of the reactor core up to a position within the primary coolant vapor phase zone in the upper portion of the vessel above the primary coolant liquid level. The primary coolant liquid level is regulated so that those portions of the steam generating tubes wherein nucleate boiling occurs will not be exposed to the primary coolant vapor phase, and the amount of tube heat absorbing surface exposed to the vapor phase will remain substantially constant under pitch and roll conditions.

---

The present invention relates to a nuclear reactor arrangement and more particularly to a compact reactor incorporating a steam generator within the reactor pressure vessel and to a method of operating the same.

A nuclear reactor of the general type herein referred to has been disclosed in U.S. Patent, 3,151,034. That reactor incorporates the entire primary portion of the reactor plant within a single pressure vessel, resulting in many economies both as to cost and to size. As noted in that patent, the widespread use of nuclear reactors as power sources for commercial merchant ships depends to a great extent upon the possibility of reducing the size and weight of the reactors, as well as the costs thereof, to a point where they may economically replace the power source now normally used for such merchant ships.

Compact nuclear reactors, as disclosed in the above-identified patent, have been of the pressurized water type wherein the primary coolant fluid is pressurized to an extent that no net boiling occurs in the reactor core. As disclosed in that patent, a pressurizer zone is incorporated in the uppermost portion of the pressure vessel whereby a vaporized portion of the primary coolant is maintained, imposing a pressure upon the surface of the primary coolant liquid which prevents boiling within the reactor core. With this construction it is considered necessary to maintain the liquid level of the primary coolant above the upper ends of the heat exchanger tube bundles which serve as steam generators so that all heat transfer occurs between the primary coolant liquid and the coolant within the tubes of the heat exchanger. Accordingly, the level of the primary coolant liquid is maintained a substantial distance above the top of the tube bundles to insure their submergence at all times regardless of any possible movement of the liquid level as a result of ship pitch and/or roll.

It will be seen from the foregoing that the height of the reactor pressure vessel of the prior art is determined by the cumulative height of the reactor core, the height of the heat exchanger tube bundles above the core, the height of liquid over the top of the tube bundles, and the height of the vapor space operating as a pressurizer.

It is the primary object of the present invention to provide a reactor arrangement, and the method of operating such a reactor, whereby the height of the reactor pressure vessel, for a given power output, may be decreased by as much as 20% of that required by present reactors.

Accordingly, the present arrangement provides a reactor having a vertically arranged pressure vessel, a body of primary coolant contained within the pressure vessel and forming a liquid level therein, a vertically disposed member spaced inwardly from the vessel and having openings in its upper and lower ends for the circulation of the primary coolant therethrough, and a plurality of fuel elements arranged in a regular lattice as a core positioned in the lower portion of the member. A plurality of vertically extending steam generating tubes forming one or more heat exchange tube bundles are disposed in the flow space between the member and the pressure vessel with at least a portion of the tubes extending above the core. Means are provided for supplying pressurized feedwater to the lower ends of the steam generating tubes and for collecting the steam discharged from the upper ends of the steam generating tubes. A primary coolant pump is connected to the lower end of the pressure vessel to circulate the coolant through the core and the tube bundles. And means are provided for maintaining the liquid level of the primary coolant between the upper end of said tube bundle and the upper end of the core.

Furthermore, the present invention is directed to the method of operating such a nuclear reactor wherein the primary coolant liquid level is maintained between the upper end of the heat exchanger tube bundle and the upper end of the core. Heat is transferred from the primary coolant to the secondary coolant from both the liquid and the vapor phases of the primary coolant.

In the accompanying illustration, the reactor arrangement 10 of the present invention is shown comprising a vertically extending cylindrical pressure vessel 12 having a removable upper end closure 14. A nuclear core 16, capable of undergoing a self-sustaining fission-type chain reaction in a manner well known in the art, is supported in the lowermost portion of the pressure vessel by a core support cylinder 18 from the lower closure head 20 of the pressure vessel. A vertically extending cylinder member 22 is arranged coaxially within the pressure vessel surrounding the core and extending upwardly therefrom. This cylinder member may be suspended from the upper end of the pressure vessel, as by flange 24, or it may extend upwardly from the core support cylinder 18, and forms, with the inner surface of the pressure vessel, an annular passageway surrounding the core 16.

A plurality of nozzles 26 extend from and through the upper end of the pressure vessel 12. Each nozzle has a tube sheet 28 at its outer end and an outer closure head 30 spaced therefrom to form plenum chambers 31 and 31A. Alternate plenum chambers 31 may serve as feedwater supplies while the remaining chambers 31A may act as steam outlet collectors for a plurality of tubes 32 forming one or more heat exchange tube bundles 36 in the annular passageway surrounding the core. The tubes 32 extend inwardly and downwardly from the tube sheets 28 associated with the feedwater supply plenums 31 between a baffle member 34 and the inner surface of the pressure vessel 12. At the lower end of the core 16 the tubes 32 are bent upwardly to form the tube bundle 36. At the upper ends of the tube bundle 36, outlet tubes 38 extend upwardly to the tube sheets which form part of the steam outlet plenum 31A. The tube bundle is arranged to extend from near the lower end of the core 16 to a location a substantial distance above the upper end of the core.

The tube bundle 36 of the present arrangement is generally of the once-through type wherein the feedwater is introduced at the bottom and, as it flows upwardly therethrough, absorbs heat from the primary fluid and is vaporized. It is well known in the art that such once-through tube bundles may be divided into three zones according to the type of heating occurring within the tubes. The fluid within the tubes is first heated in a nucleate boiling zone and then in a film boiling zone, and finally in a superheating zone. The determination of the location of these zones depends upon the relative temperatures, pressures, and flow rates of the primary and secondary fluids, in a manner well known to those skilled in the art.

Extending outwardly from the lower portion of the pressure vessel 12 are a plurality of spaced nozzles 40 (only one of which is shown) which, after extending horizontally for a short distance, turn upwardly. Coaxially within each nozzle 40 is a tube 42 extending through the core support cylinder 18. Extending from and above nozzle 40 is a circulating pump 44 which is arranged to receive primary coolant from the lower end of tube bundle 36 through the annular space between nozzle 40 and tube 42. The pump then returns the fluid under pressure through tube 42 to the lower end of the core. In flowing upwardly through the core the coolant fluid is heated to the boiling point. It then flows upwardly in the cylindrical member 22 to and through openings 46 formed therein between the upper end of the tube bundle 36 and the upper end of the core 16. The saturated, or slightly boiling primary coolant forms a liquid level 48, above which there exists the vaporized portion of the primary coolant. As the primary coolant flows downwardly over the heat exchanger tube bundle 36, heat is transferred from the primary coolant to the fluid within the heat exchanger tubes vaporizing and superheating it.

As noted above, the tube bundle may be divided into zones. In order to reduce the height of the pressure vessel as much as possible, it is desirable to lower the liquid level as much as possible. However, it is also necessary that the reactor system remains stable during roll and/or pitch of the ship in which it is mounted. It has been found that, should the liquid level in the reactor fall below the film boiling zone into the nucleate boiling zone during the most extreme condition of ship pitch and roll, system instabilities would occur as a result of the sudden decrease in primary system pressure due to the condensation of the vapor portion of the primary coolant on the nucleate boiling portion of the tube bundle. Accordingly the liquid level is established as low as possible in the pressure vessel without the possibility of exposing any of the nucleate boiling portion of the tube bundle during most extreme expected condition of ship pitch and roll.

With the arrangement of the present invention, a major portion of the superheater section of the tube bundle 36 is disposed within the steam phase of the primary coolant, i.e. above the liquid level 48. As a result, approximately 5 to 8% of the heat transferred from the primary coolant to the secondary fluid is transferred in the steam phase zone, superheating the secondary fluid before it is removed to plenum 31A and thence to a point of use through outlet tubes 38. In the present arrangement the pressure of the primary coolant is maintained so that approximately 11% of the coolant in the core is vaporized at the rated output of the reactor.

A specific example of a reactor constructed according to the teachings of the present invention has the following parameters:

| | | |
|---|---|---|
| Reactor output | MW thermal | 62.4 |
| Primary coolant flow | lbs./hr | 6×10⁶ |
| Primary coolant pressure | p.s.i.a | 812 |
| Core inlet temperature | ° F | 493 |
| Core outlet temperature | ° F | 520 |
| Secondary coolant flow | lbs./hr | 224,000 |
| Secondary coolant pressure | p.s.i.a | 400 |
| Secondary coolant outlet temperature | ° F | 515 |
| Pressure vessel diameter | inches | 94 |
| Tube bundle height | do | 123 |
| Superheater height | do | 23 |
| Normal liquid level from top of tube bundle | inches | 20 |

Inasmuch as the present reactor is arranged to normally operate with a portion of the heat exchanger tube bundle 36 above the liquid level of the primary heating fluid, movement of the liquid level as a result of ship pitch and/or roll is of little consequence since substantially the same amount of heat absorbing surface will remain in the vapor phase of the primary coolant. In other words, as the liquid level is changed by movement of the ship in which the reactor is located, some additional heat transfer surface will be exposed to the vapor phase of the primary coolant but at the same time an equivalent amount of heat transfer surface will be submerged within the liquid phase of the primary coolant. Inasmuch as the products of the heat transfer coefficients and the log mean temperature coefficients of these zones of the tube bundle are nearly equal, the net change in heat transfer is insignificant. As a result, the height of the primary coolant previously required to assure that the tube bundle would always remain submerged may be eliminated in the arrangement of the present invention. Furthermore, the pressurizer zone of the reactors of the prior art, which were previously maintained in the uppermost part of the reactor, may be incorporated in the vapor portion of the primary coolant, again reducing the height of the reactor. Thus the size, weight, and cost of a reactor constructed according to the present invention may be reduced as much as 20% over comparable reactors of the prior art.

What is claimed is:

1. A nuclear reactor-steam generator arrangement which comprises a pressure vessel; means defining a nuclear reactor core disposed within the lower portion of said pressure vessel; a hollow member disposed within said vessel in laterally surrounding relation to said core and in spaced-apart relation to the inside surface of the vessel to define therewith a substantially unobstructed annular space extending upwardly from below the lower end of said core to a position above the upper end thereof; a plurality of steam generating tubes forming at least one tube bundle disposed within said annular space and occupying therein an elevation span extending from approximately the level of the lower end of said core up to a predetermined position above the upper end of said core, each of said tubes being disposed for communication at one end with a feedwater supply means and at the opposite end for communication with a steam receiving means; means defining an opening in the upper portion of said hollow member communicating the interior thereof with said anular space at a location above the upper end of said core; and pump means having an inlet communicating with said annular space at the lower portion thereof, and an outlet communicating with the interior of said hollow member at a location below the lower end of said core, whereby when said pressure vessel is filled with a primary coolant forming within said hollow member and annular space a liquid level above the upper end of said core, and a vapor phase above said liquid level and in equilibrium therewith, and when said reactor core is operated to generate heat, primary coolant liquid circulated by said pump means flows upwardly through said hollow member past said core to extract heat therefrom and cool same, and the primary liquid thus heated flows from said hollow member through said opening in the upper portion thereof into said annular space, and thence flows downwardly therethrough transferring heat into the tubes of said tube bundle to convert feedwater introduced into said tubes by said feedwater supply means into steam for delivery to said steam receiving means, and the primary liquid thus cooled flows into said pump means through the inlet thereof and is returned by the pump means through the outlet thereof to the lower portion of said hollow member for repeated circulation.

2. The nuclear reactor-steam generator arrangement according to claim 1 wherein the steam generating tubes of said tube bundle are arranged to define a once-through steam generator having a nucleate boiling zone, a film boiling zone and a superheater zone extending one above the other with the nucleate boiling zone being the lowermost and the superheater zone being the uppermost.

3. The nuclear reactor-steam generator arrangement according to claim 2 wherein said opening in the upper portion of said hollow member is disposed a predetermined distance below a horizontal reference plane within said vessel corresponding to a normal primary coolant liquid level above the upper end of said core.

4. The nuclear reactor-steam generator arrangement according to claim 3 wherein a major portion of said super-heater zone is disposed above said liquid level reference plane.

References Cited

UNITED STATES PATENTS

| | | | |
|---|---|---|---|
| 3,151,034 | 9/1964 | Douglass et al. | 176—65 |
| 3,153,444 | 10/1964 | Purdy et al. | 171—65 |
| 3,226,300 | 12/1965 | Zmola et al. | 176—53 |
| 3,231,474 | 1/1966 | Jones et al. | 176—53 |
| 3,255,089 | 6/1966 | Deighton | 176—61 |

FOREIGN PATENTS

| | | |
|---|---|---|
| 1,265,483 | 5/1961 | France. |

L. DEWAYNE RUTLEDGE, *Primary Examiner.*